United States Patent
Koshizen et al.

(10) Patent No.: US 9,449,509 B2
(45) Date of Patent: Sep. 20, 2016

(54) METHOD OF TRAFFIC CONGESTION ESTIMATION

(75) Inventors: Takamasa Koshizen, Wako (JP); Junji Eguchi, Wako (JP); Katsuhiro Nishinari, Tokyo (JP)

(73) Assignees: HONDA MOTOR CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 27 days.

(21) Appl. No.: 13/807,229

(22) PCT Filed: Jun. 2, 2011

(86) PCT No.: PCT/JP2011/062682
§ 371 (c)(1),
(2), (4) Date: Dec. 27, 2012

(87) PCT Pub. No.: WO2012/002097
PCT Pub. Date: Jan. 5, 2012

(65) Prior Publication Data
US 2013/0103295 A1    Apr. 25, 2013

(30) Foreign Application Priority Data
Jun. 29, 2010    (JP) ................... 2010-147570

(51) Int. Cl.
*B60W 30/16* (2012.01)
*B60W 40/04* (2006.01)
*G08G 1/01* (2006.01)
*G08G 1/052* (2006.01)

(52) U.S. Cl.
CPC ............ *G08G 1/0133* (2013.01); *B60W 30/16* (2013.01); *B60W 40/04* (2013.01); *G08G 1/052* (2013.01);
(Continued)

(58) Field of Classification Search
CPC .. G08G 1/0133; G08G 1/052; G08G 1/0104; B60W 40/04; B60W 30/16; B08G 1/00; B08G 1/01; B08B 25/04
USPC .................................................. 701/118, 119
See application file for complete search history.

(56) References Cited

U.S. PATENT DOCUMENTS

| 5,566,072 A | * | 10/1996 | Momose et al. ............... 701/117 |
| 2002/0060640 A1 | * | 5/2002 | Davis et al. .................. 342/104 |

(Continued)

FOREIGN PATENT DOCUMENTS

| CN | 101354837 A | 1/2009 |
| CN | 101488284 A | 7/2009 |

(Continued)

OTHER PUBLICATIONS
International Search Report, PCT/JP2011/062682 dated Jul. 12, 2011.
(Continued)

*Primary Examiner* — Yonel Beaulieu
*Assistant Examiner* — Martin Weeks
(74) *Attorney, Agent, or Firm* — Arent Fox LLP

(57) ABSTRACT

Disclosed is a method of traffic congestion estimation including a speed detection step of detecting speed of a vehicle in a predetermined period of time and outputting the detection result; a frequency analysis step of analyzing a frequency of the result of the speed detection and outputting the power spectrum; a slope detection step of detecting a slope of a power spectrum and outputting the detection result; a time variation calculation step of calculating time variation of the slope and outputting the calculation result; and a traffic congestion estimation step of estimating occurrence of traffic congestion from the calculation result of the time variation of the slope and outputting the estimation result.

4 Claims, 6 Drawing Sheets

(52) U.S. Cl.
CPC ...... *B60W 2520/10* (2013.01); *B60W 2550/10* (2013.01); *B60W 2550/308* (2013.01); *B60W 2750/308* (2013.01); *B60W 2750/40* (2013.01)

(56) References Cited

U.S. PATENT DOCUMENTS

| | | | |
|---|---|---|---|
| 2007/0005231 A1 | 1/2007 | Seguchi | |
| 2008/0021632 A1* | 1/2008 | Amano | G08G 1/096844 701/117 |
| 2008/0071465 A1* | 3/2008 | Chapman et al. | 701/117 |
| 2008/0275618 A1* | 11/2008 | Grimm et al. | 701/96 |

FOREIGN PATENT DOCUMENTS

| | | |
|---|---|---|
| JP | 2002-190090 A | 7/2002 |
| JP | 2002-342872 A | 11/2002 |
| JP | 2007-11557 A | 1/2007 |
| JP | 2009-286274 A | 12/2009 |

OTHER PUBLICATIONS

Chinese Office Action mailed Jan. 27, 2015 for Chinese Patent Application No. 201180032094.5, with Partial English Translation.

\* cited by examiner

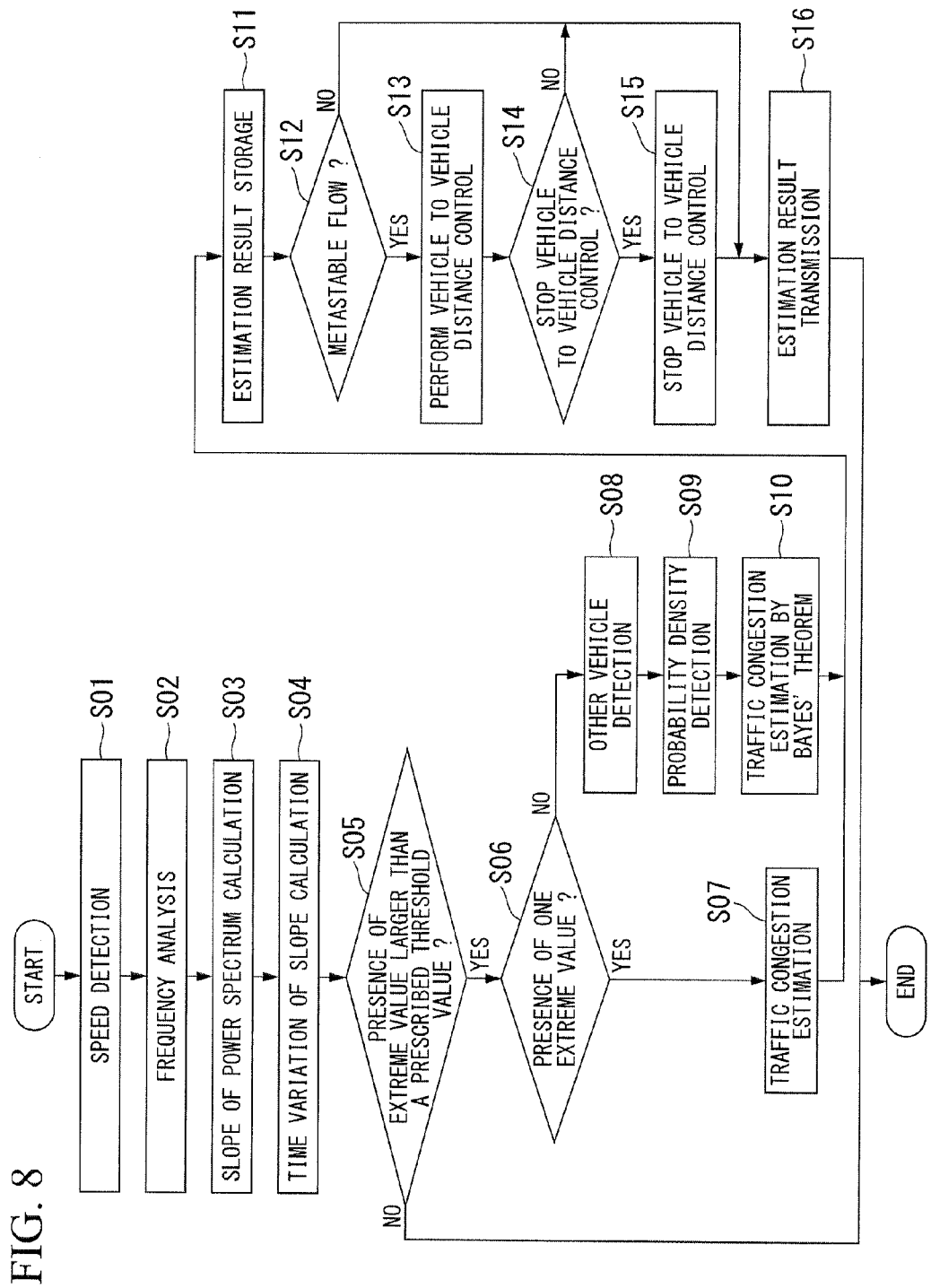

METHOD OF TRAFFIC CONGESTION ESTIMATION

CROSS REFERENCED TO RELATED APPLICATION

This application is a National Stage entry of International Application PCT/JP2011/062682, filed Jun. 2, 2011, which claims priority to Japanese Patent Application No. 2010-147570, filed Jun. 29, 2010, the disclosure of the prior application(s) are hereby incorporated in their entirety by reference.

TECHNICAL FIELD

The present invention relates to a method of traffic congestion estimation.

Priority is claimed on Japanese Patent Application No. 2010-147570, filed Jun. 29, 2010, the content of which is incorporated herein by reference.

BACKGROUND ART

In the related art, for example, an apparatus installed in a vehicle has been known in which another vehicle is detected by a millimeter wave radar device, vehicle density between the other vehicle which is within a predetermined distance from the vehicle and the other vehicle is calculated and, further, it is determined whether a traveling state of the vehicle is a cause of traffic congestion by using critical density in accordance with the speed of the vehicle to report the determination result to a driver (for example, refer to Patent document 1).

DOCUMENTS OF THE PRIOR ART

Patent Documents

[Patent document 1] Japanese Unexamined Patent Application, First Publication No. 2009-286274

DISCLOSURE OF INVENTION

Problems to be Solved by the Invention

However, according to the apparatus in the related art, since a determination process using the vehicle density is simple, there is a problem that it is difficult to improve the estimation accuracy of the traffic congestion.

The object of the present invention is to provide a method of traffic congestion estimation which is capable of appropriately improving the estimation accuracy of the traffic congestion.

Means for Solving the Problem

In order to solve the above problem to achieve the object, the present invention employed the following.

(1) According to a first aspect of the present invention, there is provided a method of traffic congestion estimation including a speed detection step of detecting speed of a vehicle in a predetermined period of time and outputting the detection result (for example, Step S01 in the embodiment), a frequency analysis step of analyzing a frequency of the result of the speed detection and outputting the power spectrum, a slope detection step of detecting a slope of a power spectrum and outputting the detection result, a time variation calculation step of calculating time variation of the slope and outputting the calculation result, and a traffic congestion estimation step of estimating occurrence of traffic congestion from the calculation result of the time variation of the slope and outputting the estimation result.

(2) The method of traffic congestion estimation according to (1) may further include an extreme value detection step of detecting a plurality of extreme values from the calculation result of the time variation of the slope and outputting the detection result, and another vehicle detection step of detecting a traveling condition of the other vehicle by a radar device and outputting the detection result, and the occurrence of the traffic congestion may be estimated using Bayes' theorem from the detection result of the plurality of extreme values and the detection result of the traveling condition of the other vehicle in the traffic congestion estimation step.

(3) The method of traffic congestion estimation according to (1) may further include a communication step of transmitting the estimation result output from the traffic congestion estimation step to the other vehicle through communication.

(4) The method of traffic congestion estimation according to (1) may further include a communication step of communicating with a preceding vehicle of the vehicle and transmitting a signal of the traveling state of the preceding vehicle which instructs traveling control performance in which a following vehicle of the preceding vehicle avoids the traffic congestion of the preceding vehicle when the occurrence of the traffic congestion is estimated from the estimation result.

(5) The method of traffic congestion estimation according to (1) may further include a cancellation step of canceling a vehicle to vehicle distance adjustment operation which automatically adjusts a vehicle to vehicle distance between the vehicle and a preceding vehicle when the occurrence of the traffic congestion is estimated from the estimation result.

Effects of the Invention

In the case of (1), it is possible to estimate the occurrence of the traffic congestion without relying on the information obtained from the outside of the vehicle by using the detection result of the speed of the vehicle which can be directly detected in real time.

Moreover, the slope in a predetermined frequency range is detected from the power spectrum obtained by analyzing the frequency of the speed and the occurrence of the traffic congestion is estimated from the time variation of the slope so that it is possible to easily improve the estimation accuracy.

In the case of (2), it is possible to accurately estimate a probability that the state of the traffic flow transitions to various kinds of states including the traffic congestion state using Bayes' theorem from the plural extreme values of the time variation of the slope in the power spectrum and the traveling condition of other vehicle (for example, the number of other vehicles present in a predetermined range outside of the vehicle and a distribution state of the vehicle to vehicle distance between the vehicle and multiple other vehicles).

In the case of (3), the estimation result is directly transmitted to the other vehicle or indirectly transmitted to the other vehicle through an appropriate relay station so that the other vehicle is likely to avoid the traffic congestion.

In the case of (4), the estimation result is directly transmitted to the preceding vehicle or indirectly transmitted to the preceding vehicle through an appropriate relay station so that the vehicle is likely to avoid the traffic congestion.

In the case of (5), an excessive automatic adjustment of the vehicle to vehicle distance is prevented and an intention of a driver can be accurately reflected in the automatic adjustment of the vehicle to vehicle distance.

BRIEF DESCRIPTION OF THE DRAWINGS

FIG. 8 is a flowchart showing a process of a method of traffic congestion estimation according to the embodiment.

EMBODIMENTS FOR CARRYING OUT THE INVENTION

Hereinafter, an embodiment of a method of traffic congestion estimation according to the present invention will be described with reference to the appended drawings.

The method of traffic congestion estimation according to the embodiment is realized by, for example, traffic congestion estimation apparatus 10 mounted in a vehicle.

Figure 1:
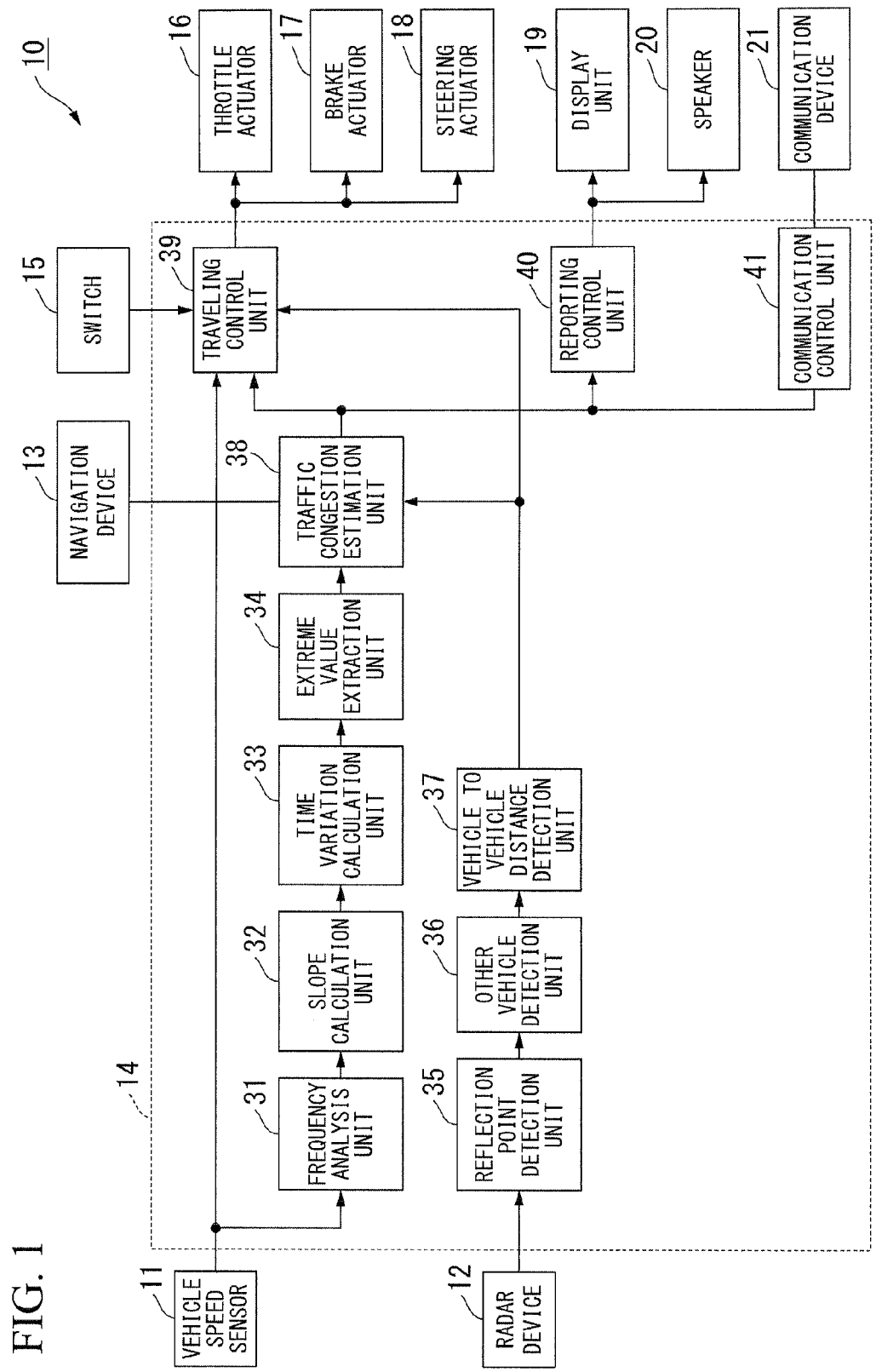
FIG. 1 is a configuration view of a traffic congestion estimation apparatus according to an embodiment of the present invention.

For example, as shown in FIG. 1, the traffic congestion estimation apparatus 10 according to the embodiment includes a vehicle speed sensor 11, a radar device 12, a navigation device 13, a processing device 14, a switch 15, a throttle actuator 16, a brake actuator 17, a steering actuator 18, a display unit 19, a speaker 20 and a communication device 21.

The vehicle speed sensor 11 detects speed of a vehicle (vehicle speed) and outputs the signal of the detection result.

The radar device 12 divides a detection target region which is set on the outside of the vehicle into plural angle regions and transmits transmission signals of an infrared laser, electromagnetic waves such as millimeter waves so as to perform scanning in each angle region. Then, the radar device 12 receives reflected signals generated in such a manner that each transmission signal is reflected by an external object of the vehicle (for example, other vehicle, a structure, a road surface). Then, the signals according to the transmission signals and the reflected signals are output to the processing device 14.

For example, the radar device 12 divides a detection target region in a predetermined angle range from the vehicle into multiple vertical angle regions of the vertical direction of the vehicle and multiple horizontal angle regions of the horizontal direction of the vehicle. Then, while the vertical angle regions are sequentially switched, for example, from above to below in the vertical direction, the radar device transmits electromagnetic waves to each of the vertical angle regions and while the horizontal angle regions are sequentially switched, for example, from the left to the right in the horizontal direction, the radar device transmits electromagnetic waves to each of the horizontal angle regions.

The navigation device 13 receives a positioning signal such as a GPS (Global Positioning System) signal to measure the position of the vehicle by using, for example, a satellite and calculates the current position of the vehicle based on the positioning signal.

In addition, for example, the navigation device 13 calculates the current position of the vehicle by a calculation process of autonomous navigation based on the speed of the vehicle (vehicle speed) and a yaw-rate detection signal output from the vehicle speed sensor 11 and a yaw-rate sensor (not shown).

In addition, the navigation device 13 includes map display data to display a map on the display unit 19 and road coordinate data which is required for a map matching process based on the current position of the vehicle as map data. Furthermore, the navigation device 13 includes data required for a process such as a path search process or a path guide process, for example, data about each node, which is a point including the latitude and longitude of a predetermined position, such as an intersection or a junction, and road data including a link which is a line linking the respective nodes used as map data. In addition, various kinds of information are added to the node and the link.

Then, the navigation device 13 performs the map matching process based on the information of the current position of the vehicle obtained from the respective calculation processes of the positioning signal and autonomous navigation or any one of the calculation processes with respect to the road data to correct the result of the position detection.

In addition, the navigation device 13 performs a process such as a path search process or a path guide process of the vehicle according to an input operation of an operator, outputs path information and various kinds of additional information to a destination on the display unit 19 with the road data and outputs various kinds of voice messages from the speaker 20.

Then, the navigation device 13 can perform a navigation process such as a path search process or a path guide process of the vehicle based on an estimation result of occurrence of traffic congestion output from a traffic congestion estimation unit 38 which will be described later and an estimation result of the estimated traffic congestion of another vehicle output from a communication control unit 41 which will be described later, for example, so as to avoid traffic congestion.

The processing device 14 includes, for example, a frequency analysis unit 31, a slope calculation unit 32, a time variation calculation unit 33, an extreme value extraction unit 34, a reflection point detection unit 35, another vehicle detection unit 36, a vehicle to vehicle distance detection unit 37, the traffic congestion estimation unit 38, a traveling control unit 39, a reporting control unit 40 and the communication control unit 41.

Then, various kinds of signals related to travel control of the vehicle output from the switch 15 are input to the processing device 14.

As the signals output from the switch 15, for example, there is a signal related to an operation state of a brake pedal (not shown) due to a driver, a signal related to an operation state of an accelerator pedal (not shown) due to a driver, a signal that instructs the starting or stopping of performing autonomous traveling control which automatically controls a travel state of a vehicle according to an input state of a driver, a signal that instructs the increase or decrease of target vehicle speed in the autonomous traveling control and a signal that instructs the increase or decrease of a target vehicle to vehicle distance with respect to a vehicle to vehicle distance between the vehicle and the other vehicle (for example, a preceding vehicle) in the autonomous traveling control (for example, the following traveling control that automatically follows a preceding vehicle).

Figure 2:
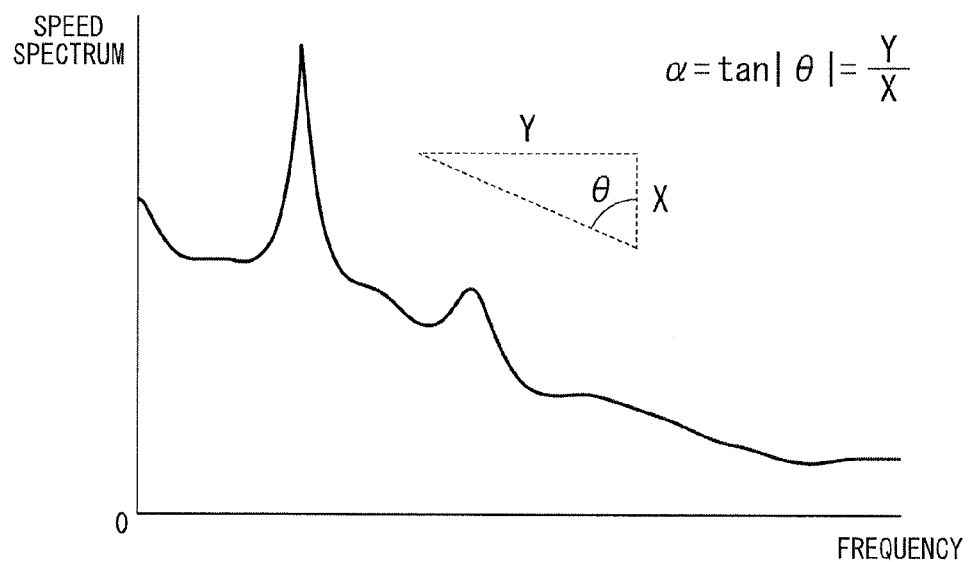
FIG. 2 is a graph showing an example of a speed spectrum according to the embodiment.

For example, the frequency analysis unit 31 analyzes the frequency of the detection result of the speed of the vehicle (vehicle speed) output from the vehicle speed sensor 11, for example, to output a power spectrum that changes according to a frequency of a speed spectrum as shown in FIG. 2.

The slope calculation unit 32, for example, calculates a simple regression line in the power spectrum output from the frequency analysis unit 31 and a slope and an intercept (a spectrum value when the frequency is zero) of the simple regression line are calculated. Then, for example, the slope a represented by the following expression (1) is calculated based on variable X of a spectrum value in a predetermined frequency range (for example, which is a frequency range corresponding to a time range of several seconds to several minutes, such as a frequency range of 0 to 0.5 Hz) Y to output the calculation result.

[Expression 1]

$$\alpha = \tan|\theta| = \frac{Y}{X} \quad (1)$$

The time variation calculation unit 33 calculates, for example, the difference of the slope a output from the slope calculation unit 32, that is, the difference $\Delta\alpha$ of a current value $\alpha_k$ and a previous value $\alpha_{k-1}$ of the slope $\alpha$ with a predetermined time interval by an arbitrary natural number k, for example, based on the following expression (2).

[Expression 2]

$$\Delta\alpha = \alpha_k - \alpha_{k-1} \quad (2)$$

The extreme value extraction unit 34 extracts an extreme value (for example, an extreme value of a squared value $(\Delta\alpha)^2$) from time variation of difference $\Delta\alpha$ or from time variation of a predetermined parameter (for example, a squared value $(\Delta\alpha)^2$ or an absolute value $|\Delta\alpha|$) by the difference $\Delta\alpha$, on the basis of the difference $\Delta\alpha$ of the slope $\alpha$ output from the time variation calculation unit 33 to output the extraction result.

Figure 3:
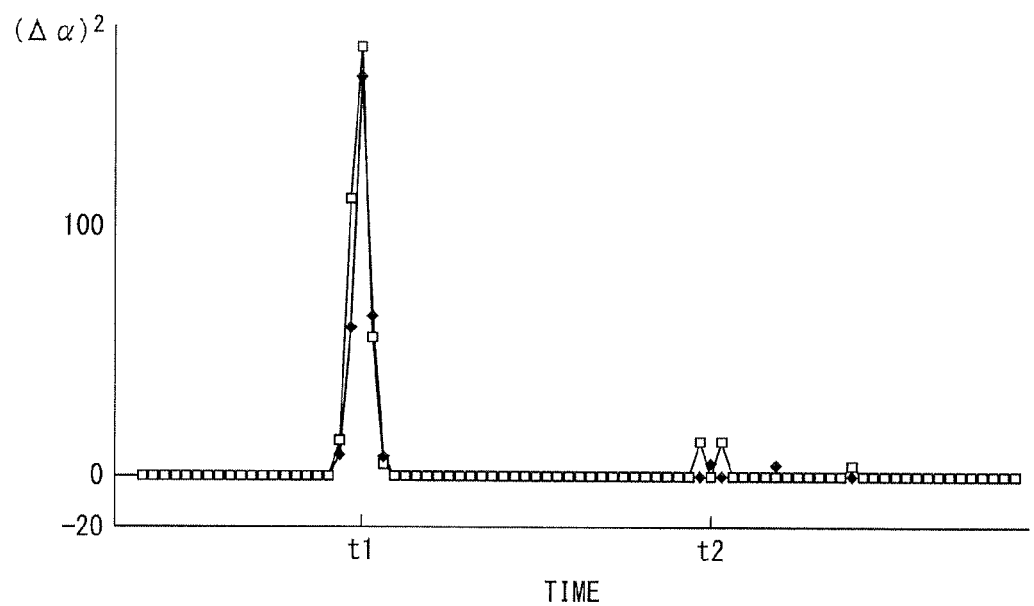
FIG. 3 is a graph showing a spectrum example of a squared value $(\Delta\alpha)^2$ of difference $\Delta\alpha$ of a slope $\alpha$ in time variation according to the embodiment.

For example, the extreme value extraction unit 34 extracts the extreme value of the squared value $(\Delta\alpha)^2$ at time t1 by determining whether each spectrum value is larger than a predetermined threshold value $X_{th}$ which is represented by the following expression (3) with respect to the spectrum of the time variation of the squared value $(\Delta\alpha)^2$ shown in FIG. 3.

For example, in the following expression (3), the predetermined value $X_{th}$ is represented by an average value $\mu(X)$ of the spectrum values and double ($2\sigma$) a standard deviation $\sigma(X)$.

[Expression 3]

$$X_{th} = \mu(X) + 2\sigma(X) \quad (3)$$

The reflection point detection unit 35 detects the position of the reflection point of the reflected signal, for example, on the basis of the signal output from the radar device 12 to output the detection result.

The other vehicle detection unit 36 detects at least one or more other vehicles present outside the vehicle, in accordance with a distance between adjacent reflection points and a distribution state of plural reflection points, for example, based on the detection result of the position of the reflection point output from the reflection point detection unit 35 to output the detection result.

The vehicle to vehicle distance detection unit 37 detects a vehicle to vehicle distance between the vehicle and other vehicle, for example, based on the detection result of at least one or more other vehicles output from the other vehicle detection unit 36 to output the detection result together with the number of detected other vehicles.

The traffic congestion estimation unit 38 performs, for example, division into two patterns A and B in accordance with the extraction result of the extreme value output from the extreme value extraction unit 34 and estimates the occurrence of the traffic congestion for each pattern A and B to output the estimation result.

In the traffic congestion estimation unit 38, the extreme value extracted from the extreme value extraction unit 34 is related to a formation process of a vehicle group in front of a traveling direction of the vehicle and the value is obtained by unique speed variance of the vehicle when a state of traffic flow transitions from a metastable flow to a mixed flow.

Figure 4:
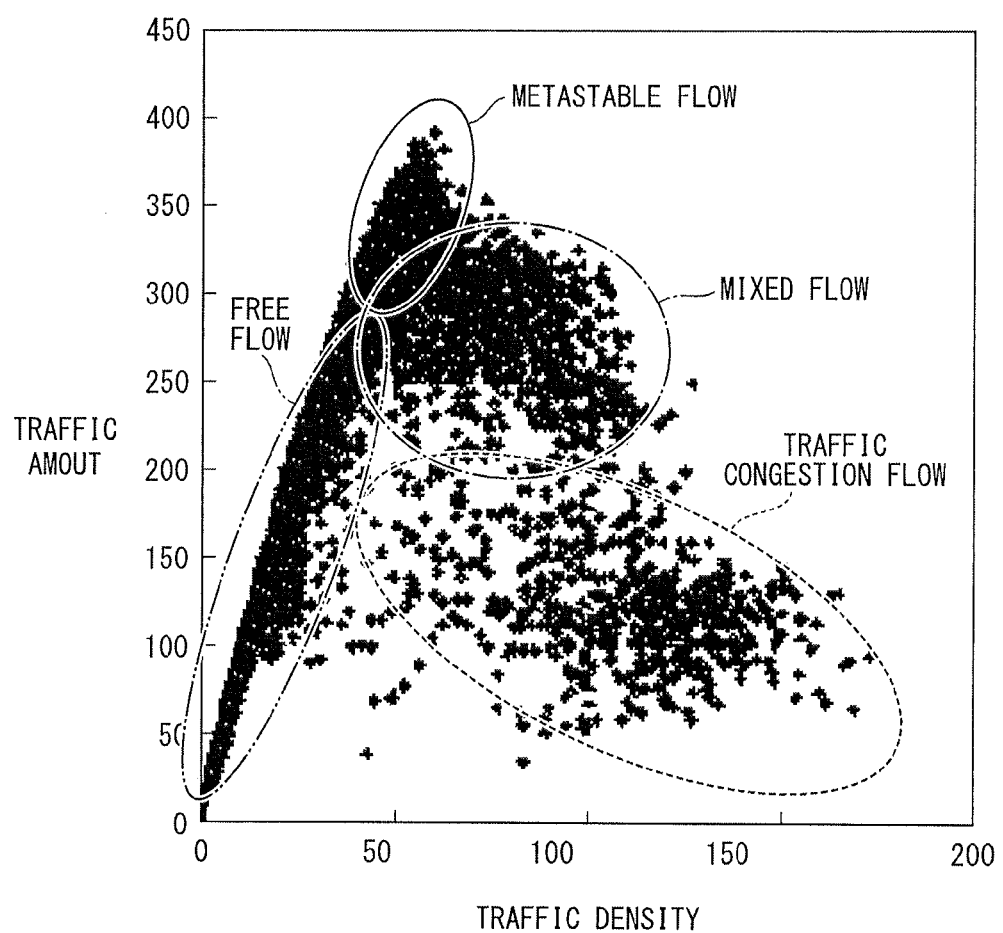
FIG. 4 is a view showing a state of traffic flow according to the embodiment.

Furthermore, for example, as shown in FIG. 4, in the rectangular coordinate plane with a traffic amount which is the number of vehicles passing a predetermined point in a predetermined time and traffic density which is the number of vehicles present in a predetermined distance range, the state of traffic flow is divided into a free flow which has a low possibility of the traffic congestion, the mixed flow in which a control state and an acceleration state of the vehicle are mixed, a traffic congestion flow which is a traffic congestion state, and the metastable flow which is a transition state present in the middle of transitioning between the free flow and the mixed flow. In particular, the mixed flow is a state before the transition to the traffic congestion flow and is a state having a high probability of the transition to the traffic congestion flow due to decreasing the traffic amount and increasing the traffic density since the degree of freedom in the driving of a driver is decreased. In addition, the metastable flow is a state where the traffic amount and the traffic density are high in comparison with the free flow and is a state of the transition to the mixed flow due to decreasing the traffic amount and increasing the traffic density.

Figure 5A:
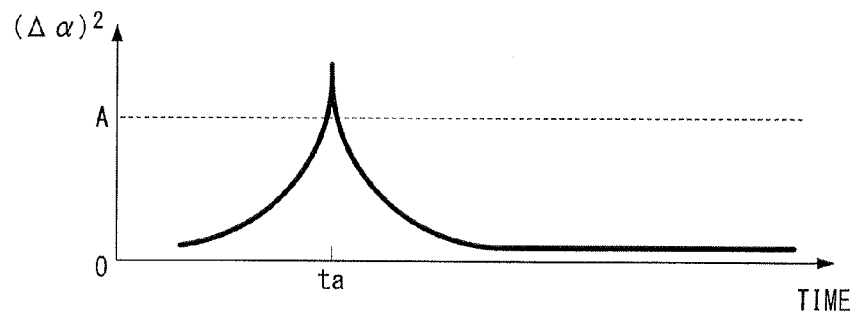
FIG. 5A is a graph showing a spectrum example of the time variation of the squared value $(\Delta\alpha)^2$ in the difference $\Delta\alpha$ of the slope a according to the embodiment.

The traffic congestion estimation unit 38 has the pattern A which is a state where certainty correlated to the metastable flow is high when only one extreme value that is larger than a predetermined value A is extracted, for example, like one extreme value of the squared value $(\Delta\alpha)^2$ in time to shown in FIG. 5A. For example, specifically, it is considered that the state where only one large extreme value is extracted corresponds to a state where one large vehicle group is formed in front of the traveling direction of the vehicle in this manner. In the pattern A, the probability of the transition from the metastable flow to the mixed flow and, further, from the mixed flow to the traffic congestion flow is a predetermined probability (for example, 80% and the like) or more and it is determined that the traffic congestion is likely to occur. In other words, it is considered that the pattern A is a state in which the unique speed variance of the vehicle is clearly observed in a state where the transition from the metastable flow to the traffic congestion flow has started.

Figure 5B:
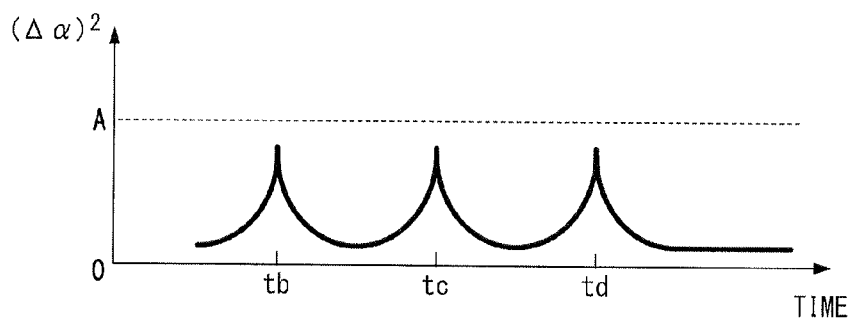
FIG. 5B is a graph showing a spectrum example of the time variation of the squared value $(\Delta\alpha)^2$ in the difference $\Delta\alpha$ of the slope a according to the embodiment.

In addition, the traffic congestion estimation unit 38 has the pattern B which is a state where uncertainty correlated to the metastable flow is high when the extreme values which are smaller than a predetermined value A are extracted, for example, like the extreme values of the squared value $(\Delta\alpha)^2$ in times tb, tc and td shown in FIG. 5B. For example, specifically, it is considered that the state where the plural small extreme values are extracted corresponds to a state where esmall vehicle groups are formed in front of the traveling direction of the vehicle in this manner. In the pattern B, the probability of the transition from the metastable flow to the mixed flow and, further, from the mixed flow to the traffic congestion flow is less than a predetermined probability (for example, 80% and the like) and it is determined whether the traffic congestion occurs is uncertain based on only the extreme value extracted by the extreme value extraction unit 34.

Then, in the pattern B, the occurrence of the traffic congestion is predicted based on Bayes' theorem by using the detection result of traveling conditions of the other vehicle (for example, the number of the other vehicles detected by the other vehicle detection unit 32 and the detection result of the vehicle to vehicle distance between the vehicle and other vehicle output from the vehicle to vehicle distance detection unit 37) in addition to the extreme value extracted from the extreme value extraction unit 34 with respect to the forming process of a vehicle group.

Figure 6:
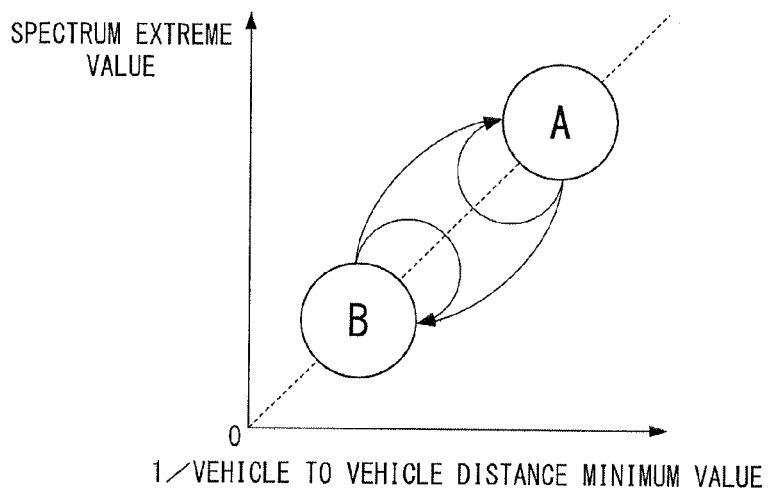
FIG. 6 is a view showing an example of a region in which each pattern A and B is present in a rectangular coordinate plane with a spectrum extreme value and an inverse of a vehicle to vehicle distance minimum value according to the embodiment.

For example, as shown in FIG. 6, each pattern A and B has a separate region where each pattern is present in the rectangular coordinate plane due to the spectrum extreme value (for example, the extreme value of the squared value $(\Delta\alpha)^2$) and the inverse of the vehicle to vehicle distance minimum value (the minimum value in the detection result of the vehicle to vehicle distance between the vehicle and other vehicle output from the vehicle to vehicle distance detection unit 37). In other words, the pattern A is present in the region in which the spectrum extreme value and the inverse of the vehicle to vehicle distance minimum value are large and the pattern B is present in the region in which the spectrum extreme value and the inverse of the vehicle to vehicle distance minimum value are small.

The inverse of the vehicle to vehicle distance minimum value is related to the forming process of a vehicle group such that, for example, specifically, a state where the inverse of the vehicle to vehicle distance minimum value is large corresponds to a state where a large vehicle group is formed in front of the traveling direction of the vehicle and a state where the inverse of the vehicle to vehicle distance minimum value is small corresponds to a state where a small vehicle group is formed in front of the traveling direction of the vehicle.

Figure 7:
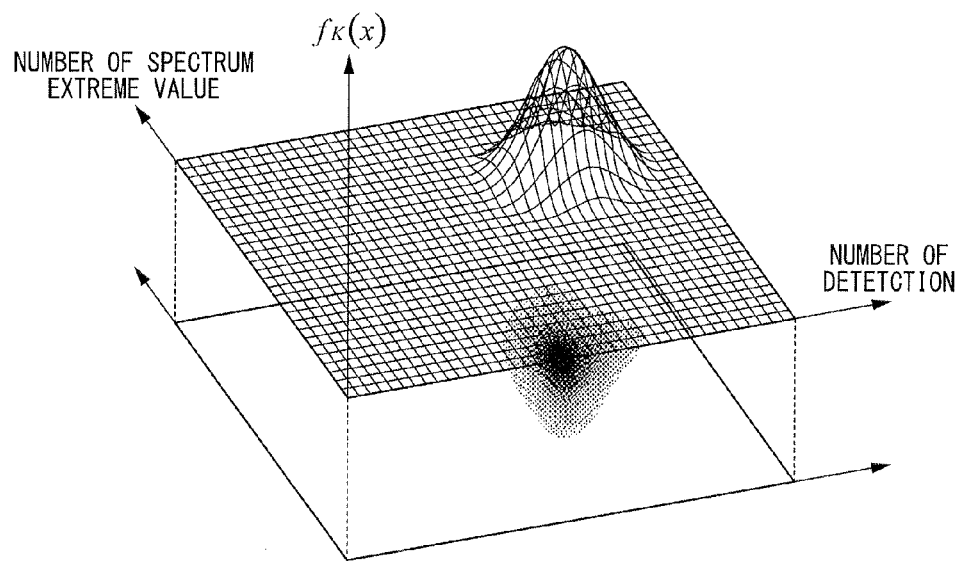
FIG. 7 is a view showing an example of probability density $f_k(x)$ of a data point x by the number of detection and the number of spectrum extreme values according to the embodiment.

The traffic congestion estimation unit 38 estimates probability density $f_k(x)$ of a data point x by a kernel density estimation method using an appropriate bandwidth h such that data $X_i$ (i=1, ..., n) using arbitrary numbers i and n is set as a combination of the number of the detection (for example, the number of the detected other vehicles) and the number of the spectrum extreme values (for example, the number of plural extreme values of the squared value $(\Delta\alpha)^2$) at an appropriate point in time, for example, as represented by the following expression (4) and as shown in FIG. 7. Then, the estimated probability density $f_k(x)$ is a probability (posterior probability) P(X|B) that an event X (X=$X_i$ (i=1, ..., n)) is generated while the generation of the pattern B is set as a condition. In other words, for example, specifically, a state where the number of detection is large is a state where the vehicle group is formed in front of the traveling direction of the vehicle and, further, a state where the number of the spectrum extreme values is present is a state where the vehicle groups are formed, which corresponds to the pattern B.

Here, a kernel function k represented by the following expression (4) is, for example, a gauss function of which the average value is zero and the distribution is 1.

[Expression 4]

$$P(X|B) = f_K(X) = \frac{1}{nh}\sum_{i=1}^{n} K\left(\frac{x-X_i}{h}\right) \quad (4)$$

Then, for example, as represented by the following expressions (5) and (6), the traffic congestion estimation unit 38 calculates each probability P(A|X) and P(B|X) using Bayes' theorem based on the probability P(X|B) described by the above expression (4), the probability (posterior probability) P(X|A) that the event X (X=$X_i$ (i=1, ..., n)) is generated while the occurrence of the pattern A is set as a condition, the probability P(A) that the pattern A is generated and the probability P(B) that the pattern B is generated.

[Expression 5]

$$P(A|X) = \frac{P(X|A)P(A)}{P(X|A)P(A) + P(X|B)P(B)} \quad (5)$$

[Expression 6]

$$P(B|X) = \frac{P(X|B)P(B)}{P(X|A)P(A) + P(X|B)P(B)} \quad (6)$$

The probability P(A|X) is a probability that the pattern A is generated while the generation of the event X (X=Xi (i=1, ..., n)) is set as a condition, that is, a probability that the pattern A is generated the next time and, as described above, the pattern A is a state in which the probability of the transition from the metastable flow to the mixed flow, and further, from the mixed flow to the traffic congestion flow is a predetermined probability (for example, 80% and the like) or more.

The probability P(B|X) is a probability that the pattern B is generated while the generation of the event X (X=Xi (i=1, ..., n)) is set as a condition, that is, a probability that the pattern B is generated the next time and as described above, the pattern B is a state in which the transition from the mixed flow to the traffic congestion flow is uncertain.

Here, each probability P(A) and P(B) is the previous value of each probability P(A|X) and P(B|X) and the initial value is a predetermined value (for example, 50% and the like).

In addition, the probability P(X|A) that the event X (X=$X_i$ (i=1, ..., n)) is generated while the generation of the pattern A is set as a condition is, for example, a probability (1-P(X|B)) other than the probability P(X|B).

In other words, for example, as shown in FIG. 6, the traffic congestion estimation unit 38 calculates each probability P(A|X) and P(B|X) including the mutual transition between the pattern A and the pattern B, as well as the transition to themselves in each pattern A and pattern B, using Bayes' theorem.

Then, the traffic congestion estimation unit 38 determines, for example, whether the probability P(A|X) that the pattern A is generated next time is a predetermined value or more and further, whether the probability P(B|X) that the pattern B is generated next time is less than a predetermined value, so as to estimate the presence of the possibility that the traffic congestion can occur (or the traffic congestion is likely to occur or the traffic congestion is not likely to occur).

The traffic congestion estimation unit 38 outputs the estimation result to the navigation device 13, the traveling control unit 39 and the reporting control unit 40 when the estimation of the occurrence of the traffic congestion is performed. Moreover, the position information such as the current position of the vehicle and a predetermined region around the current position on the map data is obtained from the navigation device 13 and the estimation result and the position information are associated with each other to be stored and output to the communication control unit 41.

In addition, when the traffic congestion estimation unit 38 directly transmits the estimation result with the communication device 21 or transmits the estimation result to a preceding vehicle of the vehicle through an appropriate server apparatus (not shown) and a relay station (not shown) in the case of outputting the estimation result to the communication control unit 41, a command to instruct the changing of the traveling state of the preceding vehicle to a traveling state where a following vehicle of the preceding vehicle is not likely to generate the traffic congestion (that is, a signal that instructs traveling control performance to avoid the traffic congestion) may be added.

The traveling control unit 39 controls the traveling of the vehicle by controlling, for example, the throttle actuator 16, the brake actuator 17 and the steering actuator 18 based on the estimation result of the occurrence of the traffic congestion output from the traffic congestion estimation unit 38, the estimation result of the occurrence of the estimated traffic congestion of the other vehicle output from the communication control unit 41 which will be described later, various kinds of signals output from the switch 15, the detection result of the speed of the vehicle (vehicle speed) output from the vehicle speed sensor 11, and the detection result of the vehicle to vehicle distance output from the vehicle to vehicle distance detection unit 37.

For example, the traveling control unit 39 starts or stops performing the autonomous traveling control according to the signals output from the switch 15, or sets or changes target speed and a target vehicle to vehicle distance in the autonomous traveling control.

In addition, for example, when it is determined that there is a possibility that the traffic congestion can occur in front of the traveling direction of the vehicle in the estimation result output from the traffic congestion estimation unit 38, the traveling control unit 39 sets the target speed and the target vehicle to vehicle distance required for the vehicle to avoid the traffic congestion (for example, for transitioning the state of the traffic flow from the metastable flow to the free flow). Then, the autonomous traveling control, to maintain the target vehicle speed and the target vehicle to vehicle distance, is performed. For example, the autonomous traveling control means constant speed traveling control which makes actual vehicle speed equal to the target vehicle speed and vehicle to vehicle distance control which makes an actual vehicle to vehicle distance equal to the target vehicle to vehicle distance (for example, the following traveling control) with respect to the other vehicle (for example, a preceding vehicle).

In addition, for example, when it is determined that there is a possibility that the traffic congestion can occur in front of the traveling direction of the vehicle in the estimation result of the occurrence of the estimated traffic congestion to the other vehicle (for example, a preceding vehicle or a following vehicle) output from the communication control unit 41 which will be described later, the traveling control unit 39 sets the target vehicle speed and the target vehicle to vehicle distance required for the vehicle to avoid the traffic congestion and further, for the following vehicle of the vehicle to not be likely to generate the traffic congestion or changes the traveling state of the vehicle.

The reporting control unit 40 controls various kinds of reporting operations by controlling, for example, the display unit 19 and the speaker 20 based on the estimation result of the traffic congestion output from the traffic congestion estimation unit 38 and the estimation result of the occurrence of the estimated traffic congestion to the other vehicle (for example, a preceding vehicle or a following vehicle) output from the communication control unit 41 which will be described later.

For example, the reporting control unit 40 reports the presence of the possibility that the traffic congestion can occur in front of the traveling direction of the vehicle (or the traffic congestion is likely to occur or the traffic congestion is not likely to occur), information on the position where the occurrence of the traffic congestion is estimated, and driving operation instructions which are required for the vehicle to avoid the traffic congestion and further, for the following vehicle of the vehicle to not be likely to generate the traffic congestion.

The communication control unit 41 communicates with the other vehicle or an appropriate server apparatus (not shown) and a relay station, for example, through radio communication by the communication device 21, and makes the estimation result of the occurrence of the traffic congestion output from the traffic congestion estimation unit 38 and the position information associated with each other to transmit or receive the information in which the estimation result with respect to the occurrence of the estimated traffic congestion to the other vehicle and the position information are associated with each other. Then, the associated information of the estimation result with respect to the occurrence of the traffic congestion obtained from the outside and the position information is output to the navigation device 13, the traveling control unit 39 and the reporting control unit 40.

The traffic congestion estimation apparatus 10 according to the embodiment is provided with the above configuration and the operations of the traffic congestion estimation apparatus 10, particularly, a process of the method of traffic congestion estimation will be described below.

First, for example, the speed of the vehicle (vehicle speed) is detected by the vehicle speed sensor 11 in Step S01 shown in FIG. 8.

Next, the frequency of the detection result of the speed of the vehicle (vehicle speed) output from the vehicle speed sensor 11 is analyzed to output a power spectrum which shows changes according to the frequency of the speed spectrum in Step S02.

Next, the simple regression line of the power spectrum is calculated and the slope and the intercept (the spectrum value when the frequency is zero) of the simple regression line are calculated in Step S03. Then, the slope a, for example, represented by the above expression (1) is calculated based on change X of the spectrum value in a predetermined frequency range (for example, a frequency range of 0 to 0.5 Hz) Y.

Next, the difference $\Delta\alpha$ of the current value $\alpha_k$ and the previous value $\alpha_{k-1}$ of the slope $\alpha$ with a predetermined time interval is calculated in Step S04 and the spectrum of time variation of the squared value $(\Delta\alpha)^2$ in the difference $\Delta\alpha$ is calculated.

Next, it is determined whether an extreme value which is larger than a predetermined threshold value $X_{th}$ in the spectrum of the time variation of the squared value $(\Delta\alpha)^2$ is present in Step S05.

If the determination result is "NO", the process ends.

On the other hand, if the determination result is "YES", the process proceeds to Step S06.

Next, in Step S06, it is determined whether only one extreme value is present. If the determination result is "NO", the process proceeds to Step S08 which will be described later.

On the other hand, if the determination result is "YES", the process proceeds to Step S07, it is determined that the probability of the transition from the metastable flow to the mixed flow and further, from the mixed flow to the traffic congestion flow, is a predetermined probability (for example, 80% and the like) or more and the traffic congestion is likely to occur, as the traffic congestion process, in Step S07 and the process proceeds to Step S11 which will be described later.

In addition, at least one or more other vehicles present outside the vehicle are detected based on the signal output from the radar device 12 to obtain the number of the detected vehicles and output the vehicle to vehicle distance between the vehicle and other vehicle in Step S08.

Next, the probability density $f_k(x)$ of the data point x represented by the following expression (4) is estimated by a kernel density estimation method using an appropriate bandwidth h such that data $X_i$ (i=1, . . . , n) using the arbitrary natural numbers i and n is set as a combination of the number of the detection (for example, the number of the detected other vehicles) and the number of the spectrum extreme values (for example, the number of the extreme values of the squared value $(\Delta\alpha^2)$ at an appropriate time point in Step S09.

Next, as a traffic congestion estimation process using Bayes' theorem, each probability P(A|X) and P(B|X) represented by the above expressions (5) and (6) is calculated and it is determined whether the probability P(A|X) that the pattern A is generated next time is a predetermined value or more and the probability P(B|X) that the pattern B is generated next time is less than a predetermined value in Step S10. Therefore, the presence of the possibility that the traffic congestion can occur (or the traffic congestion is likely to occur or the traffic congestion is not likely to occur) is estimated.

Then, the position information such as the current position of the vehicle and a predetermined region around the current position on the map data is obtained from the navigation device 13 and the estimation result of the occurrence of the traffic congestion and the position information are associated with each other and stored in Step S11.

Next, for example, it is determined that an extreme value is extracted from the time variation of the difference $\Delta\alpha$ or from the time variation of a predetermined parameter (for example, a squared value $(\Delta\alpha)^2$ or an absolute value $|\Delta\alpha|$) by the difference $\Delta\alpha$ based on the difference $\Delta\alpha$ of the slope $\alpha$ so that whether the state of the traffic flow is the metastable flow is determined in Step S12.

If the determination result is "NO", the process proceeds to Step S16 described later.

On the other hand, if the determination result is "YES", the process proceeds to Step S13.

Then, the target vehicle to vehicle distance required for the vehicle to avoid the traffic congestion (for example, for transitioning the state of the traffic flow from the metastable flow to the free flow) is set and the autonomous traveling control to maintain the target vehicle to vehicle distance, that is, the vehicle to vehicle distance control which makes an actual vehicle to vehicle distance equal to the target vehicle to vehicle distance (for example, the following traveling control) with respect to other vehicle (for example, a preceding vehicle) is performed in Step S13.

Then, it is determined whether the vehicle to vehicle distance control in operation is stopped in Step S14.

If the determination result is "NO", the process proceeds to Step S16 described later.

On the other hand, if the determination result is "YES", the vehicle to vehicle distance control in operation is stopped, for example, in case where a signal which instructs operation of the vehicle to vehicle distance control to stop is output from the switch 15 by an input operation of a driver, or, for example, in case where the transition of the traffic flow state from the metastable flow to the mixed flow is detected.

In Step S16, the estimation result of the occurrence of the traffic congestion and the position information are associated with each other and a command to instruct change of the traveling state of the preceding vehicle to a traveling state in which the following vehicle of the preceding vehicle is not likely to generate the traffic congestion (that is, a command to instruct traveling control performance to avoid the traffic congestion) is added and transmitted to the outside of the vehicle so that the process proceeds to End.

As described above, in the method of traffic congestion estimation according to the embodiment, it is possible to estimate the occurrence of the traffic congestion without relying on the information obtained from the outside of the vehicle by using the detection result of the speed of the vehicle (vehicle speed) which can be directly detected in real time.

Moreover, an extreme value is extracted from the time variation of the slope $\alpha$ of the power spectrum obtained by analyzing the frequency of the detection result of the speed of the vehicle (vehicle speed) (for example, time variation of the squared value $(\Delta\alpha)^2$ in the difference $\Delta\alpha$ of the slope $\alpha$ with a predetermined time interval) so that a formation process of a vehicle group in front of the traveling direction of the vehicle and the unique speed variance of the vehicle when the state of the traffic flow transitions from the metastable flow to the mixed flow can be detected. Due to this, it is possible to easily estimate the occurrence of the traffic congestion in the early stage of the time point before the mixed flow is generated, and with high accuracy.

Furthermore, only with the extreme value of the time variation of the slope $\alpha$ in the power spectrum caused by the speed variance of the vehicle, even when uncertainty in the traffic congestion estimation is high, the occurrence of the traffic congestion is estimated by Bayes' theorem using the detection result of the traveling condition of the other vehicle (for example, the number of the detected other vehicles and the vehicle to vehicle distance between the vehicle and other vehicle) so that the estimation accuracy can be appropriately improved.

In addition, the estimation result of the traffic congestion is directly transmitted to the other vehicle or indirectly transmitted to the other vehicle through an appropriate relay station or like so that other vehicle is likely to avoid the traffic congestion.

Moreover, the estimation result of the occurrence of the traffic congestion is transmitted to the preceding vehicle together with the signal which instructs the traveling control performance in which the following vehicle avoids the traffic congestion so that the vehicle is likely to avoid the traffic congestion.

Furthermore, in a state where the degree of the freedom of a driver is high like in the metastable flow in comparison with the mixed flow, the autonomous traveling control to avoid the traffic congestion of the vehicle (for example, constant speed traveling control and vehicle to vehicle distance control) can be performed, while, in the case where the state of the traffic flow transitions to the mixed flow or the like, an intention of a driver can be accurately reflected in the performance of the autonomous traveling control and the travel behavior of the vehicle by canceling the excessive performance of the autonomous traveling control (for example, cancellation of an automatic adjustment in vehicle to vehicle distance).

In the above-described embodiment, although the vehicle to vehicle distance detection unit 37 which detects a vehicle to vehicle distance between the vehicle and other vehicle is provided, there is no limitation thereto and the vehicle to vehicle distance detection unit 37 and the process of detecting a vehicle to vehicle distance may be omitted. In other words, when the occurrence of the traffic congestion is estimated by Bayes' theorem, the traffic congestion estimation unit 38 estimates the probability $f_k(x)$ of the data point x based on the data $X_i$ (i=1, . . . , n) by the combination of the number of the detection (for example, the number of the detected other vehicles) and the number of the spectrum extreme values at an appropriate time point. For this reason, the traffic congestion estimation apparatus 10 may include the vehicle speed sensor 11, a sensor capable of detecting the number of other vehicles present in a predetermined range outside of the vehicle and the like.

INDUSTRIAL APPLICABILITY

According to the present invention, it is possible to appropriately improve the accuracy of the traffic congestion estimation.

DESCRIPTION OF REFERENCE SYMBOLS 10 traffic congestion estimation apparatus
11 vehicle speed sensor
12 radar device
19 display unit
20 speaker
21 communication device
31 frequency analysis unit
32 slope calculation unit
33 time variation calculation unit
34 extreme value extraction unit
35 reflection point detection unit
36 other vehicle detection unit
37 vehicle to vehicle distance detection unit
38 traffic congestion estimation unit
39 traveling control unit
40 reporting control unit
41 communication control unit

The invention claimed is:

1. A computer-implemented method of traffic congestion estimation in a vehicle, comprising:
   detecting, by a sensor, a speed of a host vehicle in a predetermined period of time and outputting a speed detection result;
   analyzing, by a processing device installed in the vehicle, a frequency of the speed detection result and outputting a power spectrum that dynamically changes according to the frequency of the speed detection result;
   detecting, by the processing device, a slope of the power spectrum in a predetermined frequency range and outputting a slope detection result; calculating a spectrum of time variation of the slope within a predetermined time interval and outputting a time variation calculation result;
   estimating, by a navigation device, an occurrence of traffic congestion based on a current position of the host vehicle obtained from a global positioning system and the time variation calculation result of the slope, and outputting an estimation result;
   wherein the estimating comprises:
   in response to detecting that an extreme value of the spectrum of the time variation of the slope is greater than or equal to a predetermined value, determining, by the processing device, a speed variance of the host vehicle indicating that a traffic congestion is likely to occur due to an increasing number of vehicles in front of and in a traveling direction of the host vehicle; and
   in response to detecting that an extreme value of the spectrum of the time variation of the slope is less than a predetermined value and detecting traveling conditions of vehicles in front of and in the traveling direction of the host vehicle, determining, by the processing device, a speed variance of the host vehicle indicating that a traffic congestion is uncertainly to occur due to a decreasing number of vehicles in front of and in the traveling direction of the host vehicle; and
   canceling an execution of a vehicle distance adjustment operation which automatically adjusts a vehicle to vehicle distance between the host vehicle and a preceding vehicle when the estimation result indicates the occurrence of the traffic congestion.

2. The method of traffic congestion estimation according to claim 1, further comprising:
   detecting a plurality of extreme values from the time variation calculation result of the slope and outputting an extreme value detection result;
   detecting, by a radar device, a number of other vehicles and inter-vehicular distances between the host vehicle and the other vehicles and outputting a vehicle detection result; and
   calculating, by the processing device, a probability P(BIX) and a probability P(AIX) to estimate an occurrence of traffic congestion by using Bayes' theorem as follows:

$$P(A\mid X) = \frac{P(X\mid A)P(A)}{P(X\mid A)P(A) + P(X\mid B)P(B)}$$

$$P(B\mid X) = \frac{P(X\mid B)P(B)}{P(X\mid A)P(A) + P(X\mid B)P(B)}$$

when assuming that:
a pattern A where a traffic congestion is likely to occur and a pattern B where a traffic congestion is uncertainly to occur are defined based on the plurality of extreme values and the inter-vehicular distances;

data point X is defined as a combination of a number of the plurality of extreme values and the number of the other vehicles;

a probability P(X|B) is defined as a probability where an event of the data point X is generated while a generation of the pattern B is set as a condition;

a probability P(X|A) is equal to (1-P(X|B)) and is defined as a probability where an event of the data point X is generated while a generation of the pattern A is set as a condition;

a probability P(B|X) is defined as a probability where the pattern B is generated in a next time while a generation of the event of the data point X is set as a condition;

a probability P(A|X) is defined as a probability where the pattern A is generated in a next time while a generation of the event of the data point X is set as a condition;

a possibility P(B) is defined as a previous value of the probability P(B|X); and a possibility P(A) is defined as a previous value of the probability P(A|X).

3. The method of traffic congestion estimation according to claim 1, further comprising:

transmitting the estimation result output to another vehicle.

4. The method of traffic congestion estimation according to claim 1, further comprising:

communicating with a preceding vehicle of the host vehicle and transmitting a signal that instructs the preceding vehicle to execute a traveling control thereof so that a following vehicle of the preceding vehicle can avoid the traffic congestion when the estimation result indicates the occurrence of the traffic congestion.

* * * * *